(12) United States Patent
Reyes et al.

(10) Patent No.: US 9,404,440 B1
(45) Date of Patent: Aug. 2, 2016

(54) COMMON PLATFORM MODULAR STIRLING RADIOISOTOPE GENERATOR

(71) Applicant: LOCKHEED MARTIN CORPORATION, Bethesda, MD (US)

(72) Inventors: Jaime M. Reyes, Phoenixville, PA (US); James Gary Wood, Albany, OH (US); Meghan L. Britton, Wayne, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 589 days.

(21) Appl. No.: 13/720,892

(22) Filed: Dec. 19, 2012

Related U.S. Application Data

(60) Provisional application No. 61/577,601, filed on Dec. 19, 2011.

(51) Int. Cl.
*G21B 1/00* (2006.01)
*F02G 1/055* (2006.01)
*H02K 7/18* (2006.01)

(52) U.S. Cl.
CPC . *F02G 1/055* (2013.01); *H02K 7/18* (2013.01)

(58) Field of Classification Search
CPC .................................. G21B 1/03; G21B 1/05
USPC ................................ 376/146; 62/6; 165/185
See application file for complete search history.

(56) References Cited

PUBLICATIONS

Or, Kumar, et al., "Self-Supporting Radioisotope Generators With STC-55W Stirling Converters" Space Technology and Applications International Forum—2000.*

* cited by examiner

*Primary Examiner* — Marshall O'Connor
(74) *Attorney, Agent, or Firm* — McDermott Will & Emery LLP

(57) ABSTRACT

A radioisotope generator system may comprise a common platform convertor having two ends, and multiple heat source modules thermally coupled to each other and to the common platform convertor. A portion of the multiple heat source modules may be thermally coupled to each end of the common platform convertor. The common platform convertor may be optimized for a nominal power level.

15 Claims, 4 Drawing Sheets

COMMON PLATFORM MODULAR STIRLING RADIOISOTOPE GENERATOR

CROSS-REFERENCE TO RELATED APPLICATIONS

This application claims the benefit of priority under 35 U.S.C. §119 from U.S. Provisional Patent Application 61/577,601 filed Dec. 19, 2011, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to radioisotope generators, and more particularly to a common platform modular Stirling radioisotope generator.

BACKGROUND

The flight-proven General Purpose Heat Source Radioisotope Thermoelectric Generator (GPHS-RTG) may use the heat from the radioactive decay of $^{238}$Pu included in eighteen stacked General Purpose Heat Source (GPHS) Modules. At the beginning of life (BOL), the GPHS-RTG may have a unit power output of approximately 290 $W_{dc}$. The typical weight of the GPHS-RTG may be about 56 kg, resulting in a specific power (e.g., power density) of approximately 5.2 W/kg. With a nominal thermal power of 250 $W_{th}$ of a GPHS module at the BOL, the GPHS-RTG may have a system efficiency of approximately 6.7%. The GPHS-RTG has powered large space exploration missions (e.g., Ulysses, Galileo, and Cassini) launched in the 1990's decade, as well as the New Frontier class Pluto-New Horizons mission in 2006.

Since the mission in 2006, space programs (e.g., National Aeronautics and Space Administration (NASA)) have focused efforts on developing smaller Radioisotope Power Systems (RPS) with multi-mission capabilities, including capability of operation in Space and in planetary atmosphere environments. For example, an Advanced Stirling Radioisotope Generator (ASRG) may provide higher fuel efficiency relative to a comparable Radioisotope Thermoelectric Generator (RTG). Due to a limited inventory and future production rate of $^{238}$Pu, there may be increased incentive to use the ASRG unit. However, the nominal power output of the ASRG may limit its application to lower power missions. To compensate, additional ASRG units are typically required to meet higher power applications.

Therefore, it is desirable to develop a common platform modular Stirling radioisotope generator that can meet multi-mission power requirements.

SUMMARY

In some aspects, a radioisotope generator system is described. The radioisotope generator system may comprise a common platform convertor having a first and a second end and multiple heat source modules. The heat source modules may be thermally coupled to each other and to the common platform convertor. A first and a second portion of the multiple heat source modules may be thermally coupled to the first and the second ends of the common platform convertor, respectively. The common platform convertor may be optimized for a nominal power level.

In another aspect, a method for providing a radioisotope generator system is described. The method includes providing a common platform convertor having a first and a second end and multiple heat source modules. The heat source modules may be thermally coupled to each other and to the common platform convertor. The method also includes thermally coupling a first and a second portion of the multiple heat source modules, respectively, to the first and the second ends of the common platform convertor. Providing the common platform convertor may comprise optimizing the common platform convertor for a nominal power level.

In yet another aspect, a modular radioisotope generator system is described. The modular radioisotope generator system may comprise a number of radioisotope generator sub-systems. The radioisotope generator sub-systems may be coupled by a coupling module (e.g., electrical coupling module). Each of the radioisotope generator sub-systems may include a common platform convertor with a first and a second end and multiple heat source modules thermally coupled to each other and to the common platform convertor. A first and a second portion of the multiple heat source modules may be thermally coupled to the first and the second ends of the common platform convertor, respectively. The common platform convertor may be optimized for a nominal power level.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1A:
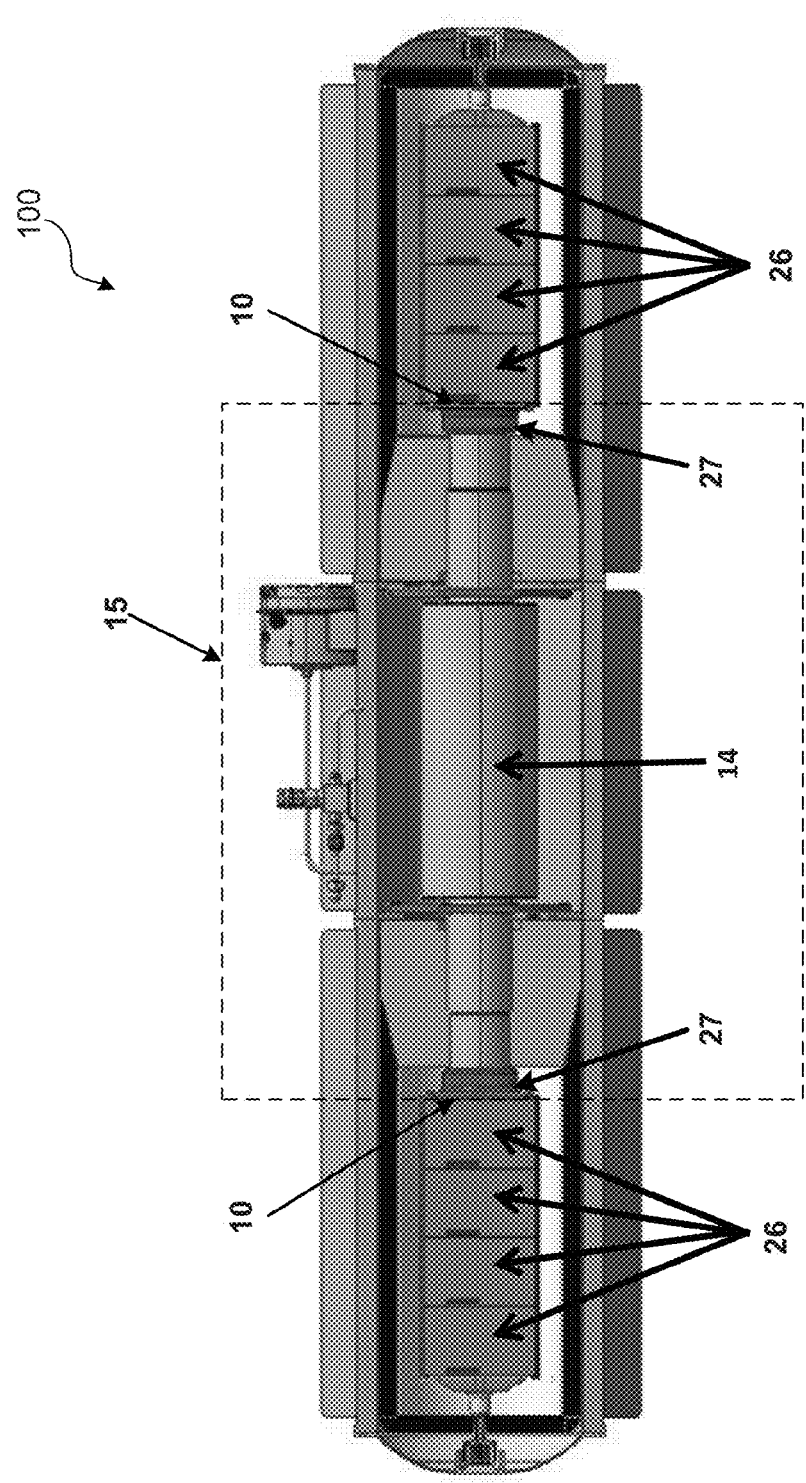
FIG. 1A is a diagram illustrating an example radioisotope generator system, according to certain embodiments.

The present disclosure is generally directed to an architecture of Stirling-based radioisotope generators for power levels up to 2000 Watts that can still trace its heritage to the Advanced Stirling Radioisotope Generator (ASRG). The ASRG may use two Stirling convertors that are joined together in opposition, one 250-Watt GPHS module at each heat collector end of the convertors, and produce a nominal output of 130 W. Qualification of the ASRG for spaceflight may provide NASA with an efficient generator for space missions. However, the power requirements of most missions requiring this type of generators may be in the 600- to 2000-Watt range. The integration of five ASRGs on a spacecraft to meet a 600-Watt mission is problematic enough, but the 16 ASRG units for 2000-Watt missions may be nearly impossible. A 2000-Watt spacecraft would need to have an enormous frame and a 2000-Watt rover would have to be pulling a long trailer; not an impossible feat but not practical. A 300-Watt generator can be designed to reduce the number of required units for these higher power missions; but, it may have to undergo a similar development and qualification program as that undertaken for 130-Watt ASRG with the accompanying development costs and risks that mission managers may not be willing to take. The 2000-Watt rover planned for Human Exploration Systems may still need 7-8 units still constituting a long trailer of generators. Radioisotope generators with at least 450-Watt output may be considered the minimum requirement for human exploration and deep Space exploration. NASA may need to have qualification programs for 300, 450, and 600-Watt generators which would be using 4, 6, and 8 GPHS modules, respectively. Research and development work (e.g., at Lockheed Martin (LM)) has shown that 8 GPHS modules (4 for each heat collector end of the convertor) may be the maximum that can be stacked in the ASRG configuration without exceeding the temperature limits of the GPHS modules, provided the LM proprietary thermal management techniques are employed.

Therefore, to eliminate duplication of development and qualification effort, costs, and risks, and to provide a standardized Stirling generator system, the common platform convertor is proposed. Since the maximum generator unit is a 600-Watt generator unit, the common platform convertor may have the dimensions that are optimized for 600-Watts. The cross-sectional dimensions, being determined by the GPHS module, may be the same through the various power levels. Because the 600-Watt unit may be longest, it can be the generator unit that has the least design safety margin; and, it may be the unit that will require the most rigorous qualification and testing for spaceflight. The lower power units: namely, 130-Watt, 300-Watt, and 450-Watt can be shorter with higher margins of safety. Qualification and testing of these units may not be as rigorous, thus resulting in lower development effort, costs, and risk. For example, a 1200-Watt power requirement may be met by 4×300-Watt units or 2×600-Watt units; and a 2400-Watt requirement may be met by 4×600-Watt units.

The present technology may eliminate the current duplicity, and reduce costs and risks associated with the development of mission specific power systems.

FIG. 1A is a diagram illustrating an example radioisotope generator system 100, according to certain embodiments of the present invention. The radioisotope generator system 100 (e.g., a common platform SRG, hereinafter "generator system 100") may include a common platform convertor 15 having two ends 10. A number of heat source modules 26 may by thermally coupled to each other and to the common platform convertor 15 through heat collector assemblies 27. The common platform convertor 15 may include a Stirling dual convertor 14 optimized for a nominal power level (e.g., 600 Watt). The heat source modules 26 may comprise general purpose heat source (GPHS) modules that can generate heat from the radioactive decay of $^{238}$Pu. The heat source modules 26 can be arranged in two groups, each group including a number (e.g., 4) of the GPHS modules 26. Each group of the GPHS modules 26 may be thermally coupled (e.g., through thermal conduction) to the common platform convertor 15, where the heat energy in converted by the Stirling dual convertor 14 to electrical power. The electrical power generated by the Stirling dual convertor 14 may be utilized, for example, to provide power for space and terrestrial vehicles, such as rovers used in exploration missions (e.g., space exploration missions).

Figure 1B:
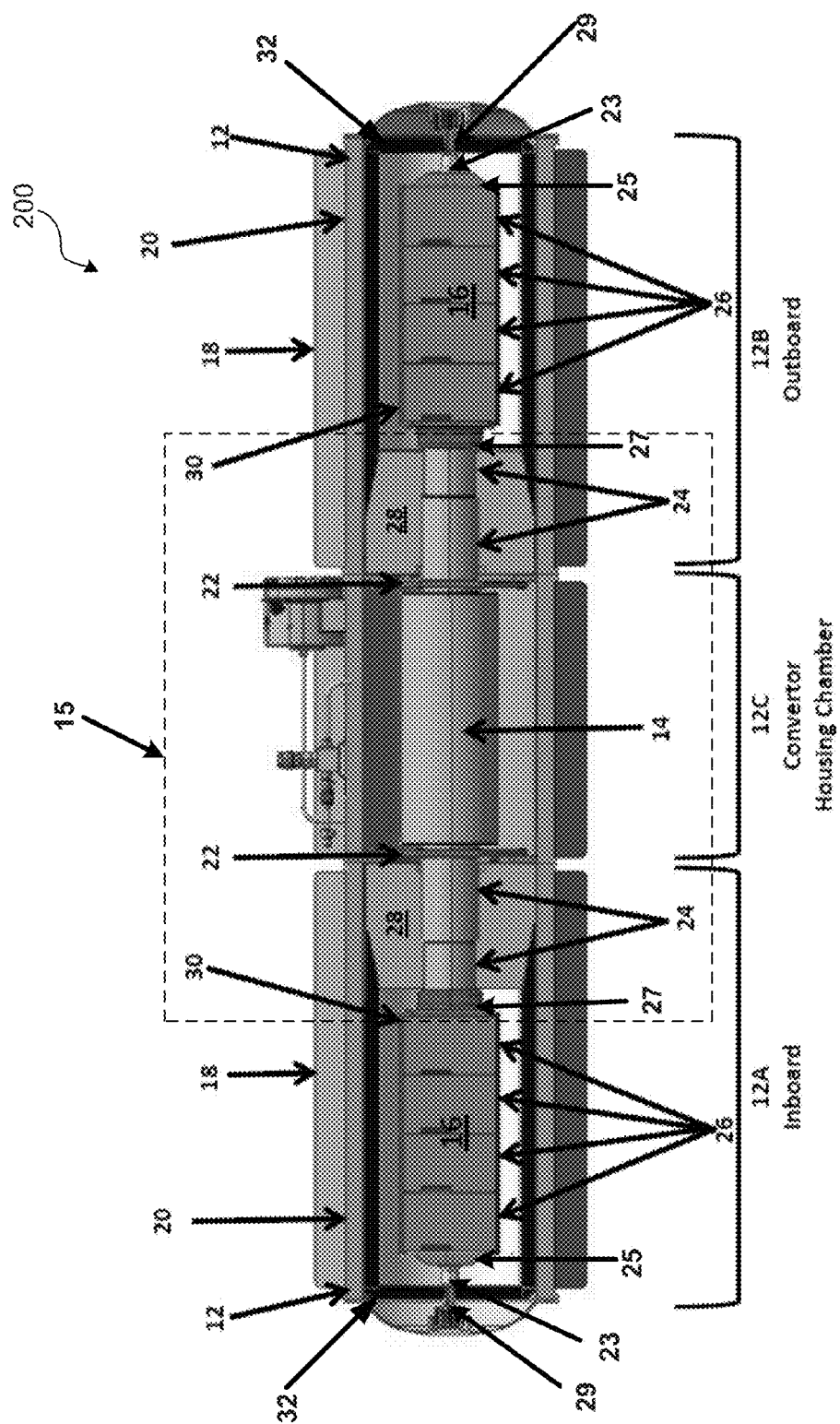
FIG. 1B is a diagram illustrating an example radioisotope generator system, showing further details of the example radioisotope generator system of FIG. 1A, according to certain embodiments.

FIG. 1B is a diagram illustrating an example radioisotope generator system 200, showing further details of the example generator system 100 of FIG. 1A, according to certain embodiments of the present invention. The radioisotope generator system 200 is a common platform SRG enclosed in a housing shell (hereinafter "housing") 12, in which three portions may be identified. The housing 12 may include an inboard portion 12A, an outboard portion 12B, and a central portion 12C that houses the common dual convertor 14. The inboard and outboard may refer to relationship with respect to a host (e.g., a rover, a space vehicle, etc.), not shown in FIG. 1A for simplicity. Each of the outboard and inboard portions may enclose a heat source assembly 16, including a group (e.g., 4) of the GPHS modules 26, thermally coupled to each other. Each heat source assembly 16 may be in thermal communication with one end of the common dual convertor 14 via heat collector assemblies 27. Accordingly, each of the heat source assemblies 16 is disposed adjacent to opposite ends of the housing 12. The housing 12 may be covered, at least partially, by a heat spreader 20, and may include a number of generally planar radiators (e.g., fins) 18, disposed along a juncture of adjacent sidewalls defining the housing 12.

In some aspects, the housing 12 may be formed from beryllium. However, other materials such as aluminum, for example, can be used. As a non-limiting example, the inboard portion 12A may be disposed adjacent to the host and the outboard portion 12B may laterally (or radially) extend outward from an outer surface of the host, similar to the conventional orientation of an Advanced Stirling Radioisotope Generator (ASRG). In certain embodiments, the housing 12 may have a round shape, for example, made of a circular cross-section cylinder. However, it is understood that the housing 12 may have any shape with any cross section such as multi-sided (e.g., square). In an aspect, each portion of the housing 12 may include a number of the radiator fins 18 (e.g., four per each portion). It is further understood that the radiator fins 18 can have any shape and size. In certain embodiments, the radiator fins 18 may be formed from beryllium or the nominal housing material. However, favorable results may be achieved by forming the radiator fins 18 from Annealed Pyrolytic Graphite (APG). Specifically, APG may distribute thermal energy uniformly to extremities (edges) of the radiator fins 18. It is understood that other materials can be used.

The common platform convertor 15 may include a cold-side adaptor flange (CSAF)/bulkhead 22 coupled to heater head 24. An insulating material 28 (e.g., a machinable insulation) such as a Microtherm® insulation (manufactured by Microtherm, Inc.) may be disposed around both of the heater heads 24. In certain embodiments, at least one heat spreader 20 (e.g., any heat spreading structure) may be disposed adjacent to at least one surface of the housing 12 to further maximize an effectiveness of the heat radiation and to minimize a temperature gradient of the housing 12. Typically, the heat spreader(s) 20 is formed from beryllium or the nominal housing material. However, favorable results may be achieved by forming the heat spreader 20 from APG. It is understood that other materials can be used. In certain embodiments, a length (e.g., 34-50 inches) of the housing 12 may be greater than a typical length (e.g., 28 inches) of the ASRG. The thicknesses of the housing 12 (including a plurality of support ribs) may also be substantially similar to the thickness of the housing in the ASRG, and may depend on the material used for the housing 12. The housing may be thermally isolated, at least partially, from the heat source assemblies 16 using the isolation layer 32, which may be formed by an efficient insulation layer such as MLI. Specifically, for a circular housing shell the MLI may include a rigid MLI, which can substantially reduce heat loss by eliminating corner gaps. Due to the use of the efficient insulation layer 32 (e.g., rigid MLI), a cross sectional dimension of the housing 12 may be substantially smaller than the cross sectional dimension of a respective housing of the ASRG.

The GPHS modules 26 of the heat source assemblies 16, may be thermally coupled via conducting elements. It is understood that, in general, any number of GPHS modules 26 may be stacked in a heat source assembly 16. For example, one, two, three, or four GPHS modules may be stacked on each side of the radioisotope generator system 200. As a non-limiting example, each of the GPHS modules 26 may be a GPHS module supplied by the United States Department of Energy. In some aspects, each of the heat source assemblies 16 may include 4 GPHS modules 26 in a linear stacked configuration. Accordingly, a nominal output power of 600 Watts may be obtained from the eight GPHS modules 26. The 600 Watts nominal output power may correspond to a power level that the common platform convertor 15 is optimized for.

However, it is understood that various configurations of the GPHS modules 26 can be used in combination with the common platform convertor 15 having various capacities to generate a required output power. As a non-limiting example, an output power of 300 or 450 Watts, respectively, may be obtained by using four or six of the GPHS modules 26, wherein the heat source assemblies 16 each include two or three of the GPHS modules 26, in a stacked configuration, to provide thermal energy to the common platform convertor 15.

In certain embodiments, when at least three of the GPHS modules 26 are stacked to provide heat to the common platform convertor 15, the temperature of the iridium clads containing the radioisotope pellets may rise above safe operating limits. Typically, the temperature of the fuel clads may rise because the heat has to pass through each of the GPHS modules 26 downstream, before reaching the heat collector assemblies 27 of the common platform convertor 15. Accordingly, a heat shunt 30 can be disposed around each of the heat source assemblies 16 and integrated with the heat collector assemblies 27 (e.g., a pressure plate of the heat collector) of the common platform convertor 15. As a non-limiting example, each of the heat shunts 30 may be formed from a high conducting carbon-graphite composite material. However, other materials and configurations can be used. In one or more aspects, integrated heat management technologies may be configured to control temperature of the radioisotope heat sources.

In use, each of the GPHS modules 26 may generate heat that is subsequently converted into electricity. Specifically, the common platform convertor 15 may receive heat from one of the heat source assemblies 16, including the GPHS modules 26, and may convert the heat to electrical energy. The housing 12 may enclose the common platform convertor 15 and the heat source assemblies 16 and insulation schemes as discussed above, and may provide protection of the enclosed components, while providing a means to manage a distribution of excess thermal energy. The heat source assemblies 16 may be hold in place by loads applied via preload studs 29, which are fitted through holes in the insulation layers 32 and into preload stud insulators 23 to the pressure plates 25. It is further understood that various configurations of the components of the generator system 100 can be used.

Figure 1C:
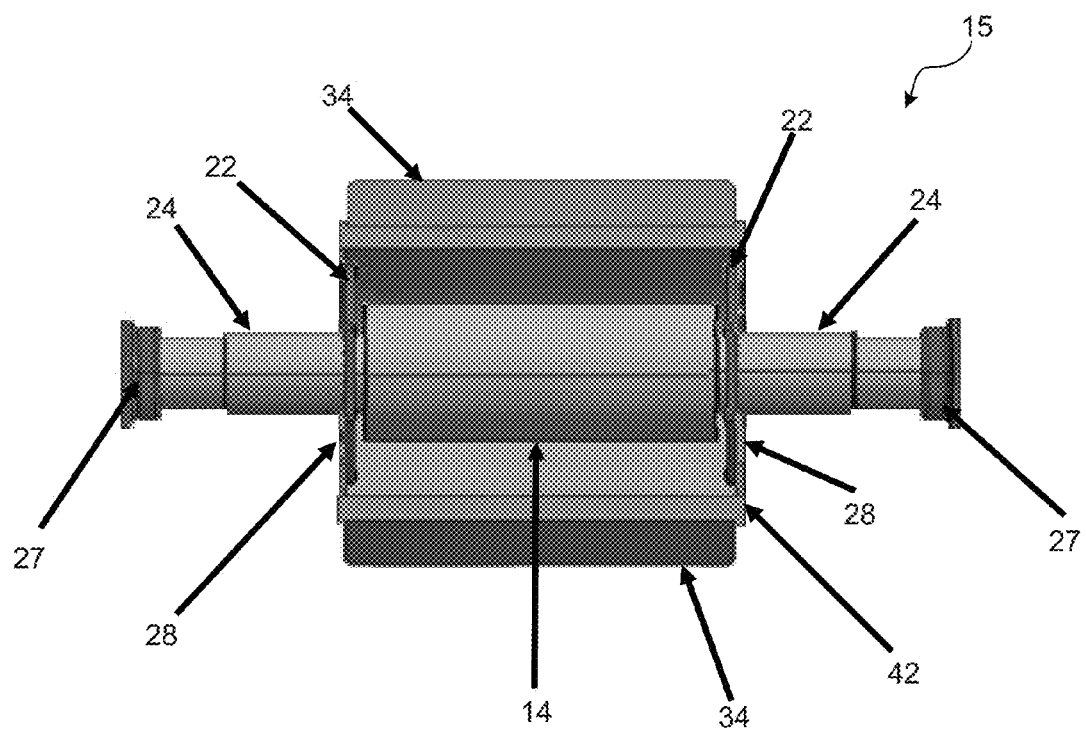
FIG. 1C is a diagram illustrating the common platform convertor of the example radioisotope generator system of FIG. 1A, according to certain embodiments.

FIG. 1C is a diagram illustrating, the common platform convertor 15 of the example generator system 100 of FIG. 1A or 200 of FIG. 1B, according to certain embodiments of the present invention. The common platform convertor 15 may comprise a dual Stirling convertor 14 housed in a single casing shell. The dual Stirling convertor 14 may be in thermal communication with heat collector assemblies 27 via heater heads 24. The heater heads 24 and heat collector assemblies 27 may facilitate an efficient thermal coupling between the dual Stirling convertor 14 and the heat source assemblies 16 of FIGS. 1A and 1B. As a non-limiting example, the central segment 42 of the generator housing may be sealed (e.g., welded) to the casing shell of the dual Stirling convertor 14 at the CSAFs 22 and bulkheads 28. The central segment 42 can be hermetically sealed and backfilled with a conductive gas to assist in the heat rejection, thus functioning as a vapor chamber. Fins 34 may be added to the central segment 42 of the generator housing for better heat rejection.

Figure 1D:
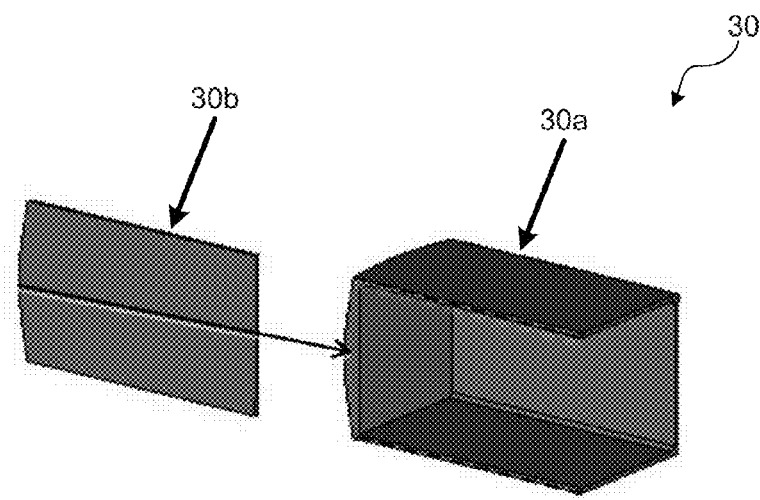
FIG. 1D is a diagram illustrating a heat shunt that surrounds the heat source assemblies of the radioisotope generator system of FIG. 1B, according to certain embodiments.

FIG. 1D is a diagram illustrating a heat shunt 30 that surrounds the heat source assemblies 16 of the radioisotope generator system 200 of FIG. 1B, according to certain embodiments. Although the heat shunt 30 is shown as two pieces 30a and 30b for three-dimensional illustration purposes, the heat shunt 30 may be provided and used as a single piece. The heat shunt 30 can be disposed around each of the heat source assemblies 16 and integrated with the heat collector assemblies 27 of FIG. 1B. As a non-limiting example, the heat shunts 30 may be formed from a high conducting carbon-graphite composite material. However, other materials and configurations can be used.

Figure 2:
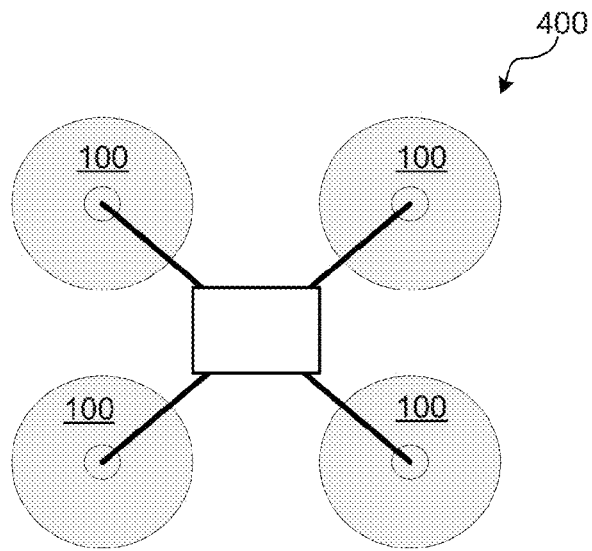
FIG. 2 is a diagram illustrating a conceptual design of an example modular radioisotope generator system formed by electrically coupling four generators, according to certain embodiments.

FIG. 2 is a diagram illustrating a conceptual design of an example modular radioisotope generator system 400 formed by coupling four generators, according to certain embodiments of the present invention. The modular radioisotope generator system 400 may comprise a number of (e.g., four) generator system 100 of FIG. 1A. As discussed above, the generator system 100 may be optimized for efficiency and thermal distribution at a nominal power output (e.g., 300 Watts, 450 Watts, 600 Watts, etc.). However, to meet the multi-mission power requirements of up to more than 2000 Watts, a group of the generator systems 100 may be integrated to generate higher power levels than possible by an individual generator system 100. For example, a group of four generator system 100 may electrically coupled to each other, for example, via electrical coupling to form the modular radioisotope generator system 400. The modular radioisotope generator system 400 may be configured to provide up to 2400 Watts at a power density of approximately 11 W/Kg using four 600 W generators.

Figure 3:
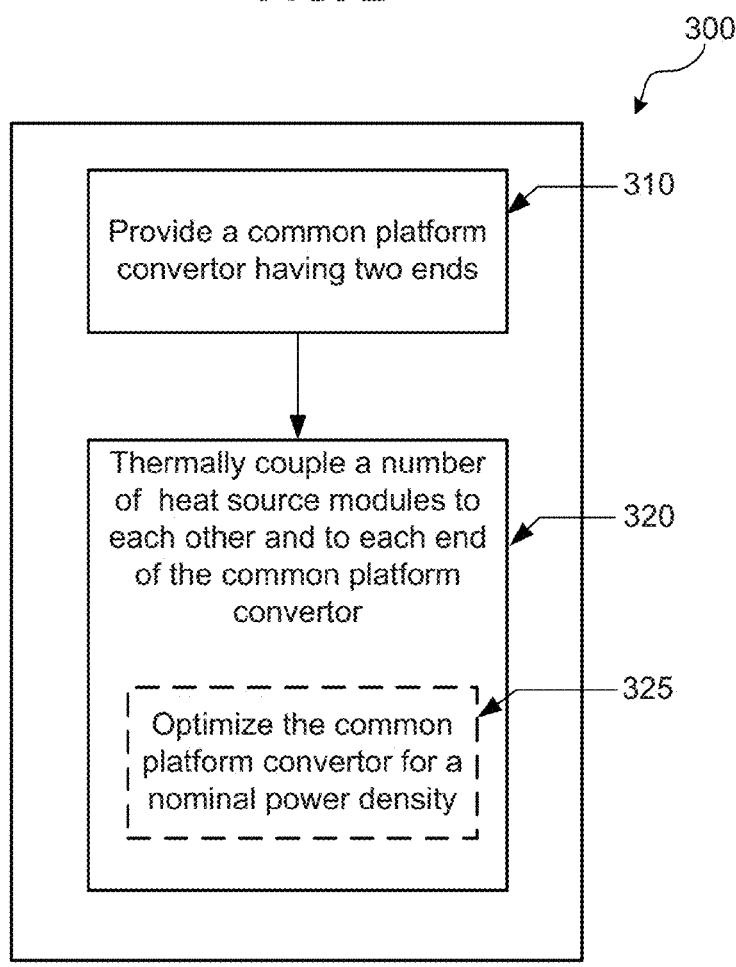
FIG. 3 is a flow diagram illustrating an example method for providing a radioisotope generator system, according to certain embodiments.

FIG. 3 is a flow diagram illustrating an example method 300 for providing a radioisotope generator system 100, according to certain embodiments. At operation block 310, a common platform convertor 15 of FIG. 1A having two ends 10 of FIG. 1A may be provided. The common platform convertor 15 may be thermally coupled to multiple heat source modules 26 of FIG. 1A (Operation block 320). A portion (e.g., a half) of the multiple heat source modules 26 may be thermally coupled to each end 10 of the common platform convertor 15 via heat collector assemblies 27 of FIGS. 1B and 1C. At step 325, as part of the operation block 320, the common platform convertor 15 may be optimized for a nominal power (e.g., 600 Watts) at a specific power density (e.g., 11 W/Kg).

In some aspects of the invention, the subject technology is related to radioisotope generators, and more particularly to a common platform Stirling radioisotope generator. In some aspects, the subject technology may be used in various markets, including for example and without limitation, radioisotope generator markets.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed embodiments, one having ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A radioisotope generator system, comprising:
   a single common platform convertor having a first and a second end, and
   a plurality of heat source modules packaged in a first and a second portion, the heat source modules of each of the first and the second portion thermally coupled to each other and to the single common platform convertor, wherein:
   the first and the second portion of the plurality of heat source modules are thermally coupled to the first and the second end of the single common platform convertor, respectively, and
   the single common platform convertor comprises a dual Stirling convertor, heater heads, and heat collector assemblies.

2. The radioisotope generator system of claim 1, wherein the single common platform convertor comprises a dual Stirling convertor housed in a single casing shell, and wherein the heat source modules comprise radioisotope heat sources.

3. The radioisotope generator system of claim 1, wherein the single common platform convertor is optimized to achieve a nominal power level at a specific power density, and wherein the nominal power level is approximately 600 Watts, and the specific power density is approximately 11 W/Kg.

4. The radioisotope generator system of claim 3, wherein the optimized single common platform is employed along with a reduced number of heat source modules to generate lower power levels than the nominal power level, without changing specifications of the optimized common platform, including dimensions of the optimized common platform.

5. The radioisotope generator system of claim 1, further comprising a housing shell and a multilayer insulation (MLI), wherein the housing shell is thermally isolated from the plurality of radioisotope generators by the MLI, and wherein the MLI is an efficient MLI that is arranged to reduce a size of the housing shell.

6. The radioisotope generator system of claim 5, wherein the housing shell comprises:
   a) a cylinder with at least one of a circular or multiply-sided cross section, and
   b) at least one of beryllium or aluminum.

7. The radioisotope generator system of claim 1, wherein the heat source modules comprise radioisotope heat sources.

8. The radioisotope generator system of claim 1, wherein a number of radioisotope generator systems are integrated to provide power levels within the range of approximately 100-2000 Watts.

9. A radioisotope generator system, comprising:
   a plurality of radioisotope generator sub-systems: and
   a coupling module configured to couple the plurality of radioisotope generator sub-systems, each of the plurality of radioisotope generator sub-systems comprising:
   a single common platform convertor having a first and a second end, and
   a plurality of heat source modules packaged in a first and a second portion, the heat source modules of each of the first and the second portion thermally coupled to each other and to the single common platform convertor, wherein:
   the first and the second portion of the plurality of heat source modules are thermally coupled to the first and the second end of the single common platform convertor, respectively, and
   the single common platform convertor comprises a dual Stirling convertor, heater heads, and heat collector assemblies.

10. The radioisotope generator system of claim 3, wherein the nominal power level of approximately 600 Watts is achieved by including eight heat source modules, four heat source modules packaged in each of the first and second portions of the plurality of heat sources.

11. The radioisotope generator system of claim 4, wherein the lower power levels include approximately 450 Watts, 300 Watts, and 130 Watts, and wherein the 450 Watts, 300 Watts, and 130 Watts are achieved by employing six, four and two heat source modules, respectively.

12. The radioisotope generator system of claim 5, wherein the housing shell comprises a circular housing shell, and wherein the circular housing shell comprises a rigid MLI, which is configured to substantially reduce heat loss by elimination of corner gaps.

13. The radioisotope generator system of claim 6, wherein the housing shell is configured to enclose the single common platform convertor, the plurality of heat source modules, and insulation schemes.

14. The radioisotope generator system of claim 1, wherein the heat collector assemblies and heater heads are configured to transport heat generated by the heat source modules to the dual Stirling convertor.

15. The radioisotope generator system of claim 7, and wherein the system further comprises integrated heat management technologies configured to control temperatures of the radioisotope heat sources.

* * * * *